(12) United States Patent
Adachi et al.

(10) Patent No.: US 10,994,579 B2
(45) Date of Patent: May 4, 2021

(54) TOWING DEVICE FOR AUTOMATIC GUIDED VEHICLE, AND AUTOMATIC GUIDED VEHICLE PROVIDED WITH THE SAME

(71) Applicants: AICHIKIKAI TECHNOSYSTEM CO., LTD., Nagoya (JP); HONDA MOTOR, CO., LTD., Tokyo (JP)

(72) Inventors: Ryuji Adachi, Nagoya (JP); Takayuki Kaneko, Tokyo (JP)

(73) Assignees: AICHIKIKAI TECHNOSYSTEM CO., LTD., Nagoya (JP); HONDA MOTOR CO., LTD., Tokyo (JP)

( * ) Notice: Subject to any disclaimer, the term of this patent is extended or adjusted under 35 U.S.C. 154(b) by 346 days.

(21) Appl. No.: 16/314,142

(22) PCT Filed: Jun. 28, 2017

(86) PCT No.: PCT/JP2017/023659
§ 371 (c)(1),
(2) Date: Dec. 28, 2018

(87) PCT Pub. No.: WO2018/012285
PCT Pub. Date: Jan. 18, 2018

(65) Prior Publication Data
US 2019/0202249 A1    Jul. 4, 2019

(30) Foreign Application Priority Data
Jul. 14, 2016    (JP) .............................. JP2016-139079

(51) Int. Cl.
*B60D 1/14*    (2006.01)
*B60D 1/36*    (2006.01)
(Continued)

(52) U.S. Cl.
CPC ................. *B60D 1/14* (2013.01); *B60D 1/36* (2013.01); *B60D 1/52* (2013.01); *B61B 13/00* (2013.01);
(Continued)

(58) Field of Classification Search
CPC ... B60D 1/14; B60D 1/36; B60D 1/52; B60D 2001/005; B61B 13/00; B62B 5/00; B61G 1/32; B62D 53/00; B62D 63/04
(Continued)

(56) References Cited

U.S. PATENT DOCUMENTS 3,489,432 A * 1/1970 Karlstrom .............. B60D 1/465
280/504
4,575,112 A * 3/1986 Tremblay ............... B60D 1/155
280/479.1
(Continued)

FOREIGN PATENT DOCUMENTS

| CA | 2816506 A1 | 5/2012 |
|---|---|---|
| JP | 2000-211526 A | 8/2000 |

(Continued)

OTHER PUBLICATIONS

International Search Report dated Aug. 8, 2017 for corresponding foreign Application No. PCT/JP2017/023659, p. 1.

*Primary Examiner* — Kevin Hurley
*Assistant Examiner* — Felicia L. Brittman
(74) *Attorney, Agent, or Firm* — United IP Counselors, LLC

(57) ABSTRACT

A towing device for connecting an automatic guided vehicle to a carriage is disclosed. When connecting an automatic guided vehicle to a carriage, a swing arm is moved toward a connecting member by a moving device, whereby the swing arm is engaged with the connecting member to thereby regulate the swiveling (swinging) of the connecting
(Continued)

FORWARD RUNNING DIRECTION member with respect to the automatic guided vehicle. Furthermore, after the automatic guided vehicle is connected to the carriage, the swing arm is moved in a direction away from the connecting member by the moving device, whereby the engagement between the swing arm and the connecting member is released, thereby allowing the connecting member to swivel (swing) with respect to the automatic guided vehicle.

7 Claims, 13 Drawing Sheets

(51) Int. Cl.
*B62B 5/00* (2006.01)
*B60D 1/52* (2006.01)
*B62D 63/04* (2006.01)
*B61B 13/00* (2006.01)
*B61G 1/32* (2006.01)
*B62D 53/00* (2006.01)

(52) U.S. Cl.
CPC ............... *B61G 1/32* (2013.01); *B62B 5/00* (2013.01); *B62D 53/00* (2013.01); *B62D 63/04* (2013.01)

(58) Field of Classification Search
USPC ........................................................ 180/14.1
See application file for complete search history.

(56) References Cited

U.S. PATENT DOCUMENTS

| | | | | |
|---|---|---|---|---|
| 4,807,714 | A | * | 2/1989 | Blau ..................... B60D 1/465 180/168 |
| 8,991,851 | B1 | * | 3/2015 | Kringstad ................ B60D 1/01 280/504 |
| 2012/0112433 | A1 | | 5/2012 | Williams, Jr. et al. |
| 2013/0049326 | A1 | | 2/2013 | Williams, Jr. et al. |

FOREIGN PATENT DOCUMENTS

| | | |
|---|---|---|
| JP | 2003-11813 A | 1/2003 |
| JP | 2007-290598 A | 11/2007 |
| WO | 2012/060841 A1 | 5/2012 |

* cited by examiner

TOWING DEVICE FOR AUTOMATIC GUIDED VEHICLE, AND AUTOMATIC GUIDED VEHICLE PROVIDED WITH THE SAME

CROSS-REFERENCE TO RELATED APPLICATIONS

This application is the U.S. National Phase of International Application No. PCT/JP2017/023659, filed Jun. 28, 2017, which claims priority to Japanese Patent Application No. 2016-139079, filed Jul. 14, 2016. The contents of both of those applications are incorporated by reference herein in their entirety.

TECHNICAL FIELD

The present disclosure relates to a towing device for an automatic guided vehicle capable of connecting an automatic guided vehicle and a carriage, and an automatic guided vehicle provided with the same.

BACKGROUND

Japanese Unexamined Patent Application Publication No. 2003-11813 (Patent Document 1) discloses a towing device for an automatic guided vehicle comprising an elongated connecting member having one end connected to a rear side in the traveling direction of an automatic guided vehicle as a towing vehicle and a hook disposed at the other end of the connecting member and engageable with a frame of a carriage.

An inclined guide surface is provided on the rear end surface of the hook in the towing device for the automatic guided vehicle described in the above-mentioned publication. The automatic guided vehicle is caused to run backward to bring the inclined guide surface of the hook into contact with the frame of the carriage, whereby the connecting member is rotated in the counterclockwise direction to engage the hook to the frame of the carriage. With this configuration, it is possible to automatically connect the carriage to the automatic guided vehicle without making any improvements to the carriage.

BRIEF SUMMARY

However, in the towing device for an automatic guided vehicle described in the above-mentioned publication, the configuration thereof is such that the carriage is rigidly connected to the automatic guided vehicle causing the steerability of the automatic guided vehicle to decline, in particular, the steerability when swiveling. Preferably, a configuration is adopted in which the connecting member is swivelably connected with respect to the automatic guided vehicle; however, there may be a case where a relative positional change of the hook relative to the carriage arises. In view of the engagement performance of the hook to the carriage, there is room for further improvement.

In view of the above, the present advancement has been made in order to accomplish an objective of providing a towing device for an automatic guided vehicle that can realize both ensuring the steerability of an automatic guided vehicle and suppressing deterioration in the engagement performance of a carriage.

Solution to Problem

In order to achieve the above object, a towing device for an automatic guided vehicle of the present advancement and an automatic guided vehicle provided with the same adopt the following means.

In accordance with a preferred embodiment of a towing device for an automatic guided vehicle according to the present advancement, a towing device for an automatic guided vehicle capable of connecting the automatic guided vehicle and a carriage is configured. The towing device for an automatic guided vehicle includes a connecting member, a hook member, a driving mechanism, and a swivel regulating mechanism. The connecting member has one end that is swivelably connected to the automatic guided vehicle with respect to the automatic guided vehicle. The hook member is disposed at the other end of the connecting member and configured to be engageable with a frame of the carriage. The drive mechanism is configured to drive the hook member so that the hook member engages with the frame of the carriage, and also drives the hook member so as to release the engagement between the hook member and the frame of the carriage. The swivel regulating mechanism is configured so as to be able to regulate the swiveling of the connecting member with respect to the automatic guided vehicle.

According to the present advancement, configuring the towing device to be swivelable with respect to the automatic guided vehicle makes it possible to ensure the steerability thereof when the automatic guided vehicle is swiveling while towing the carriage. In addition, when engaging the towing device to the carriage, regulating the swiveling of the towing device with respect to the automatic guided vehicle enables the hook member to be engaged to the carriage under a state in which the occurrence of a relative positional change of the hook member with respect to the carriage is prevented. As a result, it is possible to suppress a deterioration in the engagement performance of the carriage. Furthermore, since the hook member is configured to be driven only between the position where the hook member can be engaged with the frame of the carriage and the engagement release position where the engagement with the frame is released, it is not necessary to make any improvements to the carriage.

In accordance with a further embodiment of the towing device for an automatic guided vehicle according to the present advancement, a control device is further included for controlling the driving of the swivel regulating mechanism so as to regulate the swiveling of the connecting member with respect to the automatic guided vehicle when engaging the hook member to the frame of the carriage.

According to the present exemplary embodiment, it is possible to easily ensure a configuration for regulating the swiveling of the connecting member only when engaging the hook member with the frame of the carriage.

In accordance with a further embodiment of the traction apparatus for an automatic guided vehicle according to the present advancement, the swivel regulating mechanism includes a holding plate and a moving device. The holding plate has a holding portion capable of holding the connecting member from both sides in the swiveling direction of the connecting member. The moving device is configured to be capable of moving the holding plate between a holding position for holding the connecting member and a release position for releasing the holding of the connecting member.

According to the present exemplary embodiment, a configuration of holding the connecting member from both sides of the swiveling direction of the connecting member is adopted to move the holding plate only between the holding position for holding the connecting member and the releasing position for releasing the holding of the connecting member, thereby making it possible to easily ensure a configuration for regulating the swiveling of the connecting member.

In accordance with a further embodiment of the towing device for an automatic guided vehicle according to the present advancement, the holding portion has guide rollers that contact the connecting member and guide the relative movement of the holding plate with respect to the connecting member.

According to the present exemplary embodiment, the relative movement of the holding plate with respect to the connecting member may be smoothly performed.

In accordance with a further embodiment of the towing device for an automatic guided vehicle according to the present advancement, the moving device comprises: a motor having a rotary shaft; a disc member concentrically coupled to the rotary shaft; and a cam roller provided on the disc member in an eccentric state with respect to the rotary shaft. In addition, the holding plate includes an elongated hole that extends in a direction orthogonal to the moving direction of the holding plate and configured to engage with the cam roller is formed in the holding plate. Thus, the cam roller revolving around the rotary shaft along with the rotation of the rotary shaft is rolled in the elongated hole to thereby linearly move the holding plate. Here, in addition to the shaft supporting the rotor of the motor, that is, the output shaft of the motor, an axis connected to the output shaft of the motor and rotated by the output shaft of the motor is preferably included in the "rotary shaft" of the present advancement.

According to the present exemplary embodiment, a configuration in which the rotational motion of the rotary shaft is converted into the linear motion of the holding plate allows the space in the movement direction of the holding plate to be kept small. As a result, it is possible to make the device compact.

In accordance with a further embodiment of the towing device for an automatic guided vehicle according to the present advancement, the moving device further includes a guide member that is disposed along the movement direction of the holding plate to enable to hold at least a part of the holding plate so as to guide the movement of the holding plate.

According to the present exemplary embodiment, it is possible to move the holding plate in a more stable state. This configuration allows the swiveling of the connecting member to be reliably regulated.

In accordance with a preferred embodiment of an automatic guided vehicle according to the present advancement, there is provided an automatic guided vehicle including: a vehicle body; a drive unit having driving wheels swivelably supported with respect to the vehicle body; and a caster disposed so as to be freely swivelable with respect to the vehicle body; the automatic guided vehicle configured to be capable of towing a carriage by means of the towing device for the automatic guided vehicle according to the present advancement of any one of the above-described embodiments.

According to the present advancement, using the connection member of the towing device according to the present advancement of any one of the above described embodiments makes it possible to achieve the same effect as the effect of the towing device of the present advancement, for example, the realization of ensuring the swiveling performance of the automatic guided vehicle and suppressing the deterioration of the engagement performance of the carriage can both be achieved.

According to the present advancement, ensuring the swiveling performance of the automatic guided vehicle and the suppressing a deterioration of the engagement performance of the carriage may both be achieved.

DETAILED DESCRIPTION OF THE PREFERRED EMBODIMENTS

Next, best modes for carrying out the present advancement will now be described with reference to exemplary embodiments, given by way of example.

Exemplary Embodiments

Figure 1:
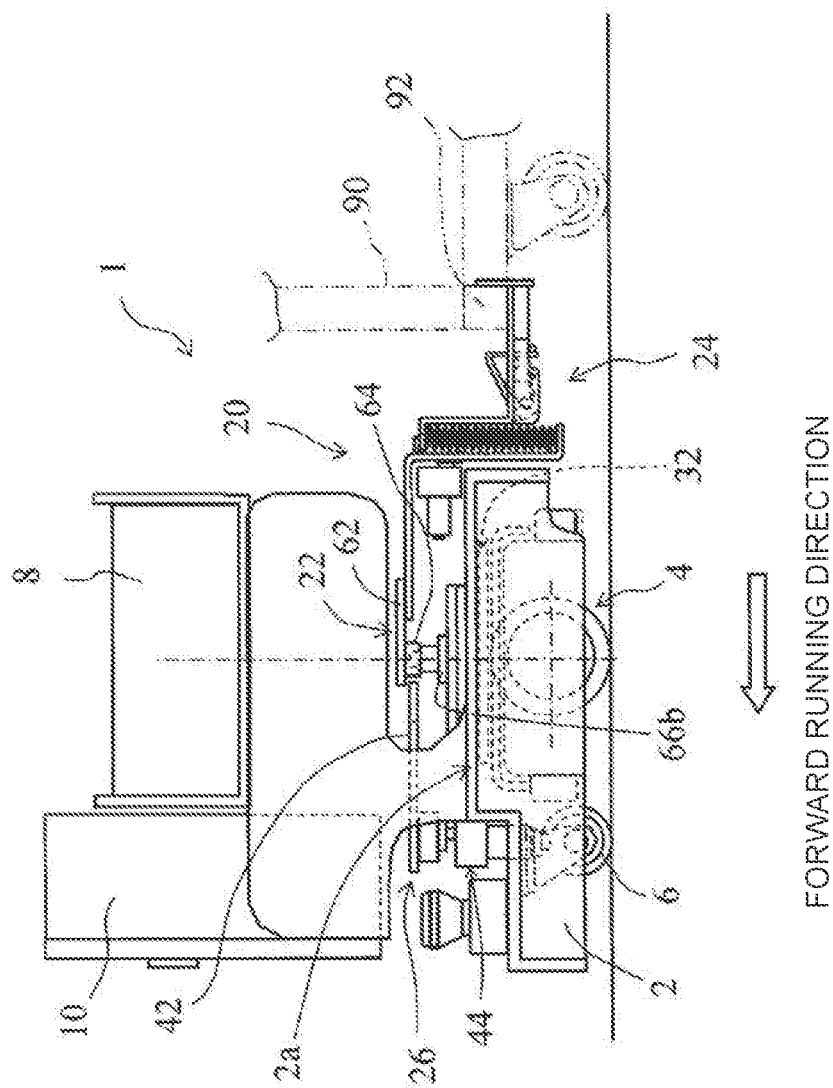
FIG. 1 is a side view of an automatic guided vehicle 1 mounted with a towing device 20 according to an exemplary embodiment of the present disclosure as viewed from the side.
Figure 2:
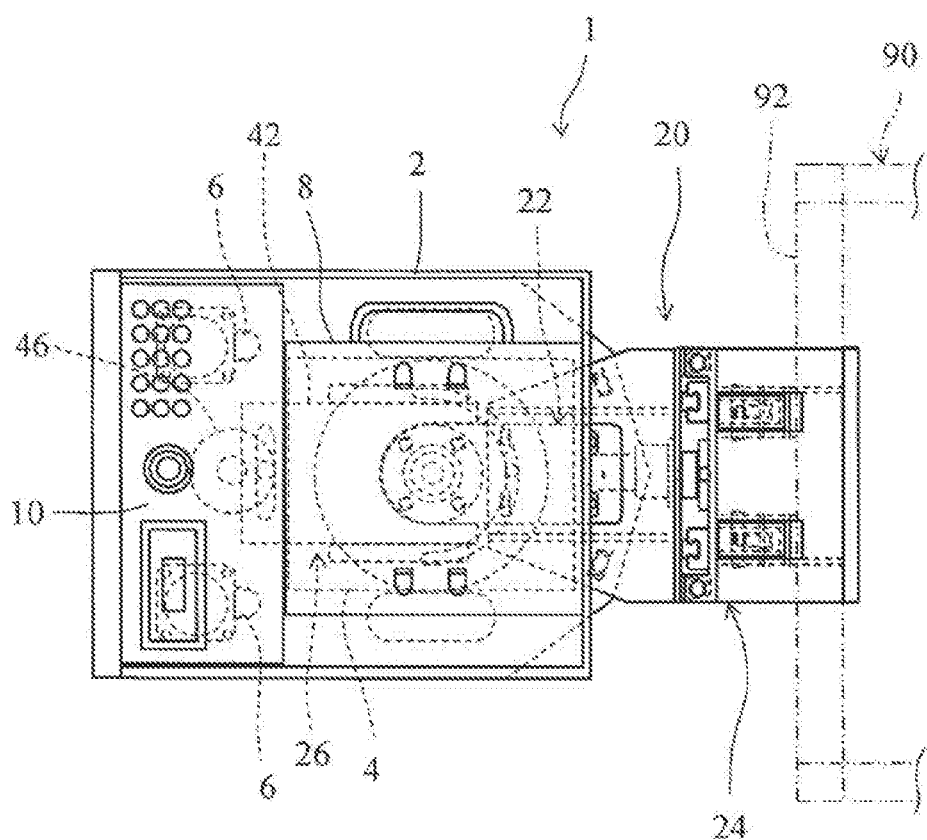
FIG. 2 is a plan view of the automatic guided vehicle 1 mounted with the towing device 20 according to an exemplary embodiment of the present disclosure as viewed from above.

As shown in FIGS. 1 and 2, an automatic guided vehicle 1 according to the present exemplary embodiment includes a vehicle body 2, a drive unit 4 that is disposed so as to be swivelable on the vehicle body 2, a pair of front side casters 6 and 6 provided at two positions, left and right, on the front side in the forward running direction, a battery 8, and a control device 10 for controlling the entire automatic guided vehicle 1. The automatic guided vehicle 1 is configured to tow a carriage 90 by means of a towing device 20 according to the present exemplary embodiment. It is to be noted that in the present embodiment, for convenience sake, the front side in the traveling direction when the automatic guided vehicle 1 travels forward is defined as the "front side", and the rear side is defined as the "rear side" in the traveling direction. Further, the right side towards the traveling direction when the automatic guided vehicle 1 travels forward is defined as the "right side" and the left side in the traveling direction is define as the "left side".

Figure 3:
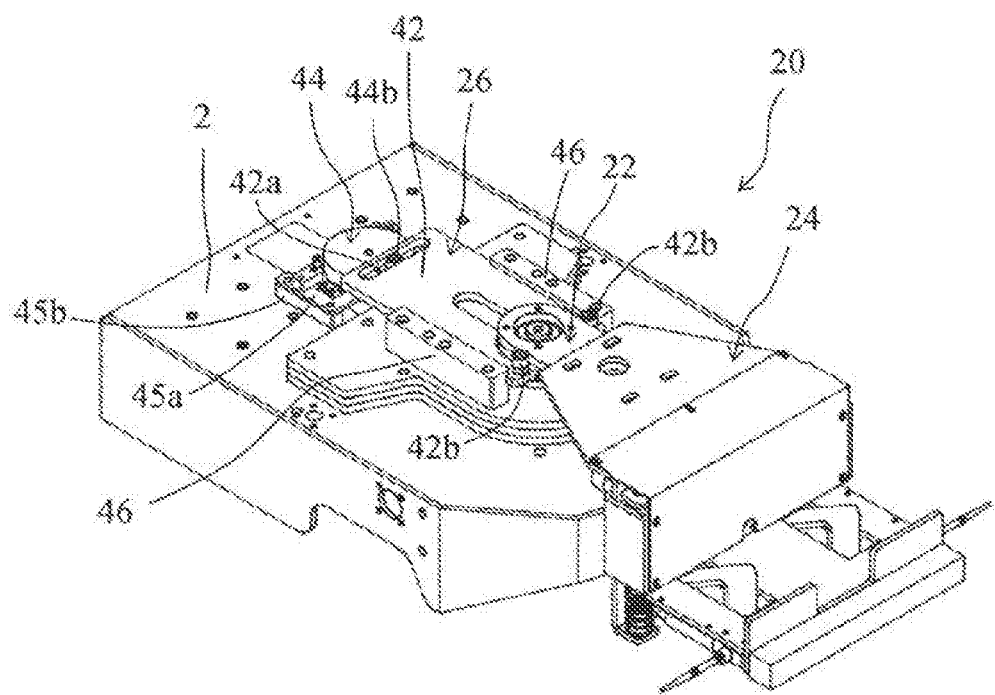
FIG. 3 is a perspective view showing an appearance of the towing device 20 according to an embodiment of the present disclosure.
Figure 4:
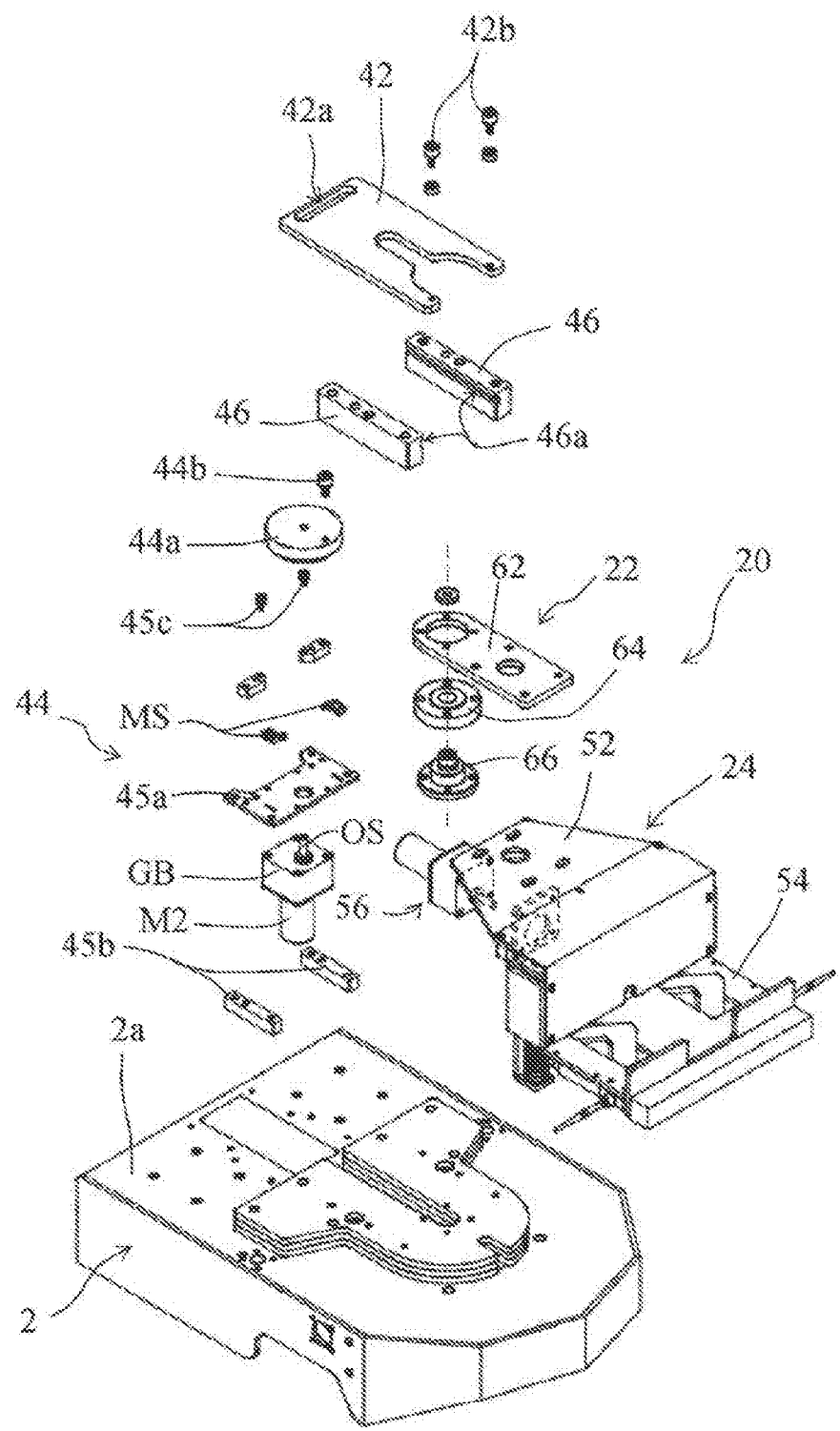
FIG. 4 is an exploded perspective view of the towing device 20 according to an embodiment of the present disclosure.

As shown in FIGS. 3 and 4, the towing device 20 according to the present exemplary embodiment includes a connecting member 22, one end of which is swivelably connected to the automatic guided vehicle 1, a hook member 24 fastened to the other end of the connecting member 22, and a swivel regulating mechanism 26 for regulating the swiveling of the connecting member 22.

Figure 5:
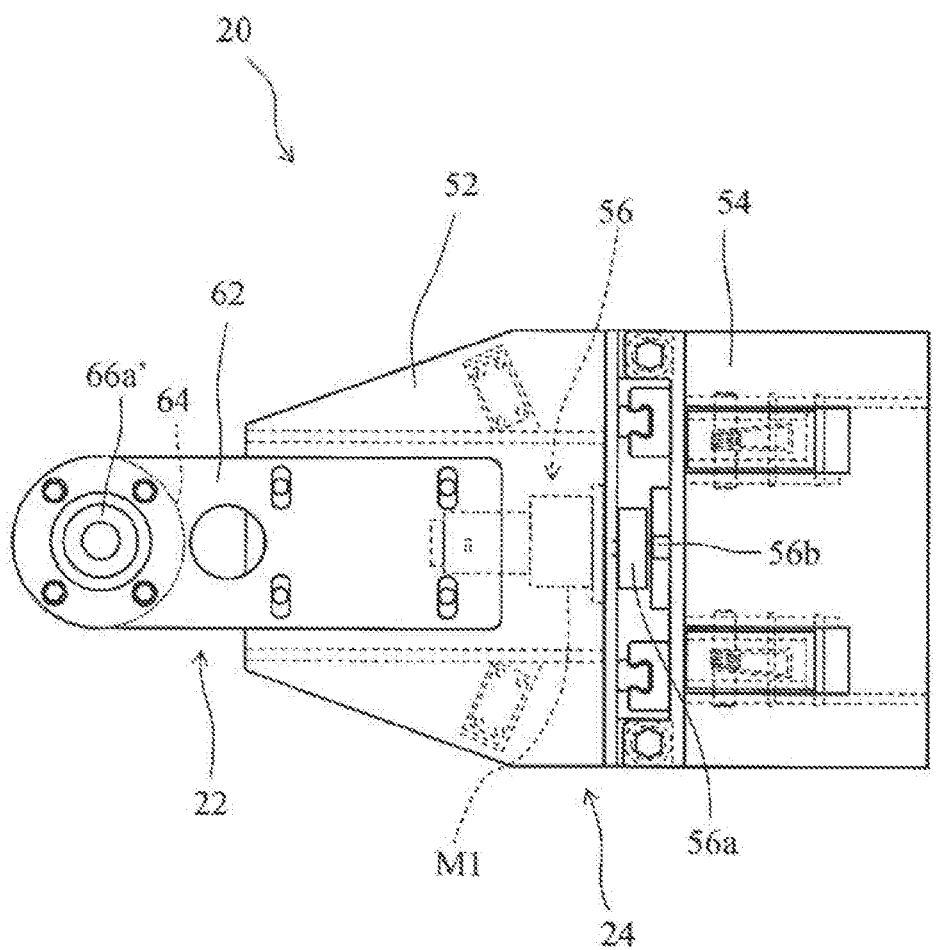
FIG. 5 is a plan view of the towing device 20 according to an embodiment of the present disclosure as viewed from above.

As shown in FIG. 4, the connecting member 22 is composed of a slide plate 62, a bearing holder 64, and a swivel shaft 66. As shown in FIG. 5, the slide plate 62 is formed as a plate member having a substantially rectangular shape in plan view, and the hook member 24 is fastened to one end portion thereof in the longitudinal direction while the bearing holder 64 is fastened to the other end portion thereof in the longitudinal direction. As shown in FIG. 4, the bearing holder 64 has a substantially disc-like outer shape, and as shown in FIG. 6, a ball bearing B is installed therein.

Figure 6:
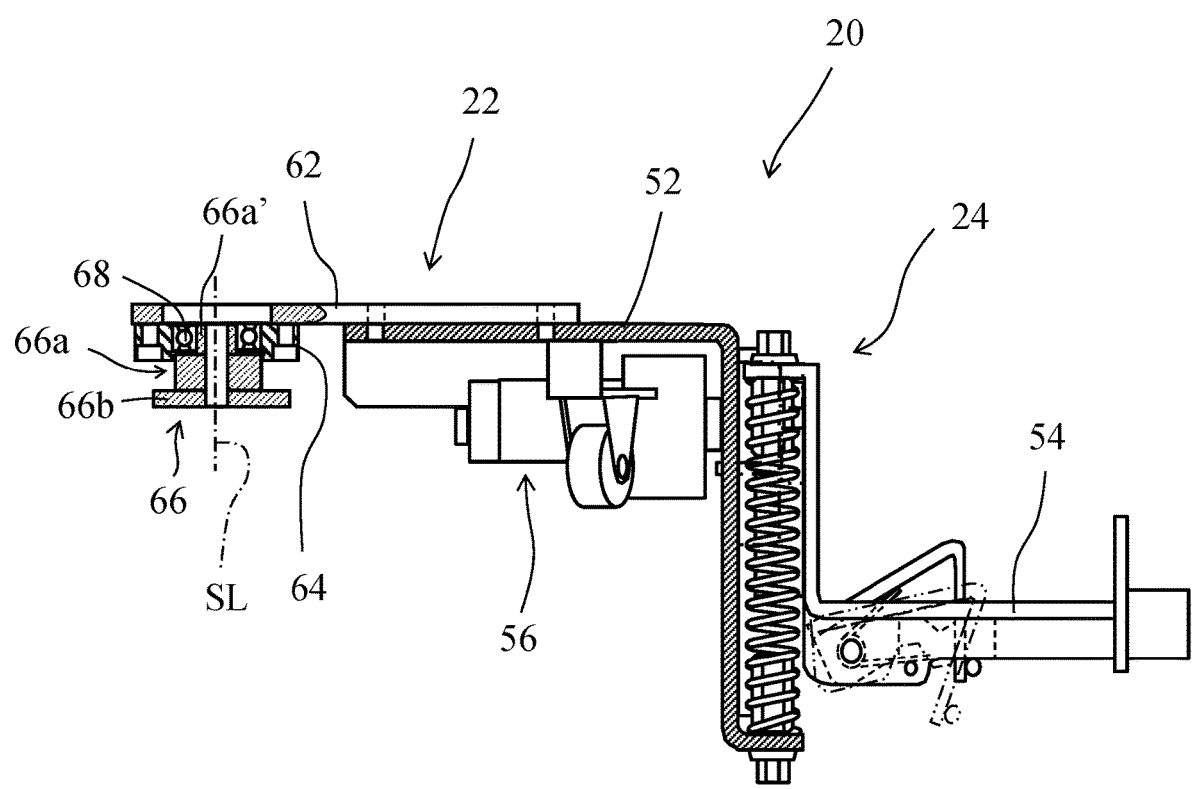
FIG. 6 is a side sectional view showing a part of the towing device 20 according to the embodiment of the present disclosure as viewed from the side in a cross section.

As shown in FIG. 6, the swivel shaft 66 has a stepped shaft portion 66a and a flange portion 66b. A small diameter shaft portion 66a' of the stepped shaft portion 66a is fitted to the inner peripheral surface (inner hole of the inner race) of the ball bearing B. Furthermore, the flange portion 66b is fastened to a base portion 2a of the vehicle body 2 of the automatic guided vehicle 1 as shown in FIG. 1.

As shown in FIGS. 4 and 5, the hook member 24 includes a swing frame 52, a tow hook 54 attached to the swing frame 52, and a drive mechanism 56 for driving the tow hook 54 up and down vertically with respect to the swing frame 52

As shown in FIG. 5, the drive mechanism 56 includes a motor M1, a disk-shaped elevating cam 56a concentrically fixed to a rotary shaft (not shown) of the motor M1, and a cam follower 56b attached to the elevating cam 56a in an eccentric state to the rotary shaft of the motor M1. The cam follower 56b revolves around the rotary shaft of the motor M1 as the elevating cam 56a is rotated by the motor M1, whereby the tow hook 54 is moved up and down vertically. When the tow hook 54 is driven upwards, the tow hook 54 is in a state of being engageable with a frame 92 of the carriage 90, and when the tow hook 54 is driven downwards, the engagement with the frame 92 of the carriage 90 is released.

As shown in FIGS. 3 and 4, the swivel regulating mechanism 26 includes a swing arm 42, a moving device 44 connected to the swing arm 42 for moving the swing arm 42, and a pair of slide guides 46 and 46 for guiding the movement of the swing arm 42.

As shown in FIGS. 3 and 4, the swing arm 42 is formed as a plate-like member whose one end in the longitudinal direction is bifurcated, and at the other end portion thereof in the longitudinal direction, an elongated hole 42a is formed extending in a direction orthogonal to the longitudinal direction. In addition, guide rollers 42b and 42b are provided at the distal end of the bifurcated portion. The swing arm 42 is an example of a configuration corresponding to the "holding plate" in the present disclosure.

Figure 13:
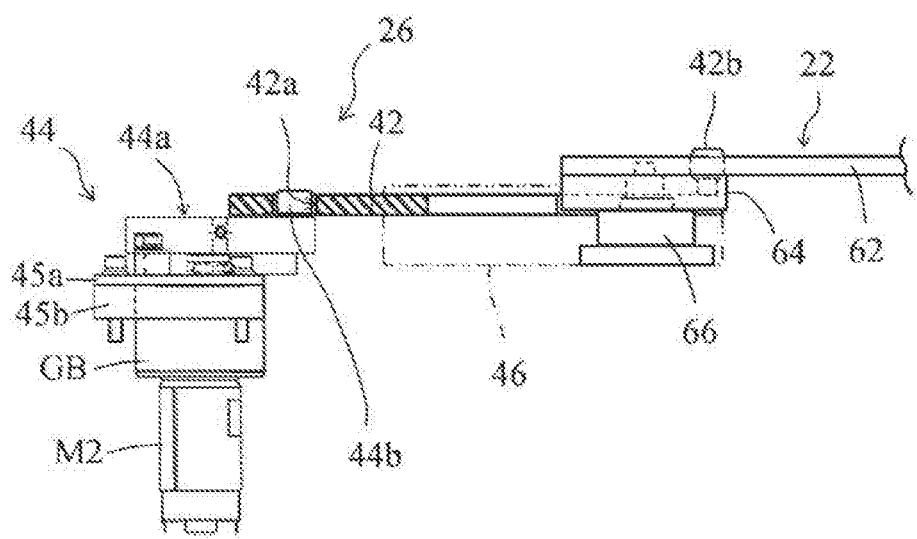
FIG. 13 is an explanatory view showing a part of the state in which the swivel regulating mechanism 26 and the connecting member 22 are engaged as viewed from the side in cross section.

As shown in FIGS. 3 and 13, the bifurcated portion of the swing arm 42 is configured to be capable of holding the side surfaces of the bearing holder 64 of the connecting member 22, and when the bifurcated portion of the swing arm 42 holds the side surfaces of the bearing holder 64, the guide rollers 42b and 42b are configured to hold the side surfaces of the slide plate 62 of the connection member 22. Note that a cam follower 44b (to be described later) of the moving device 44 will be engaged in the elongated hole 42a of the swing arm 42 as shown in FIG. 3. The bifurcated portion of the swing arm 42 and the guide rollers 42b and 42b are an example of a configuration corresponding to the "holding portion" in the present disclosure.

Figure 7:
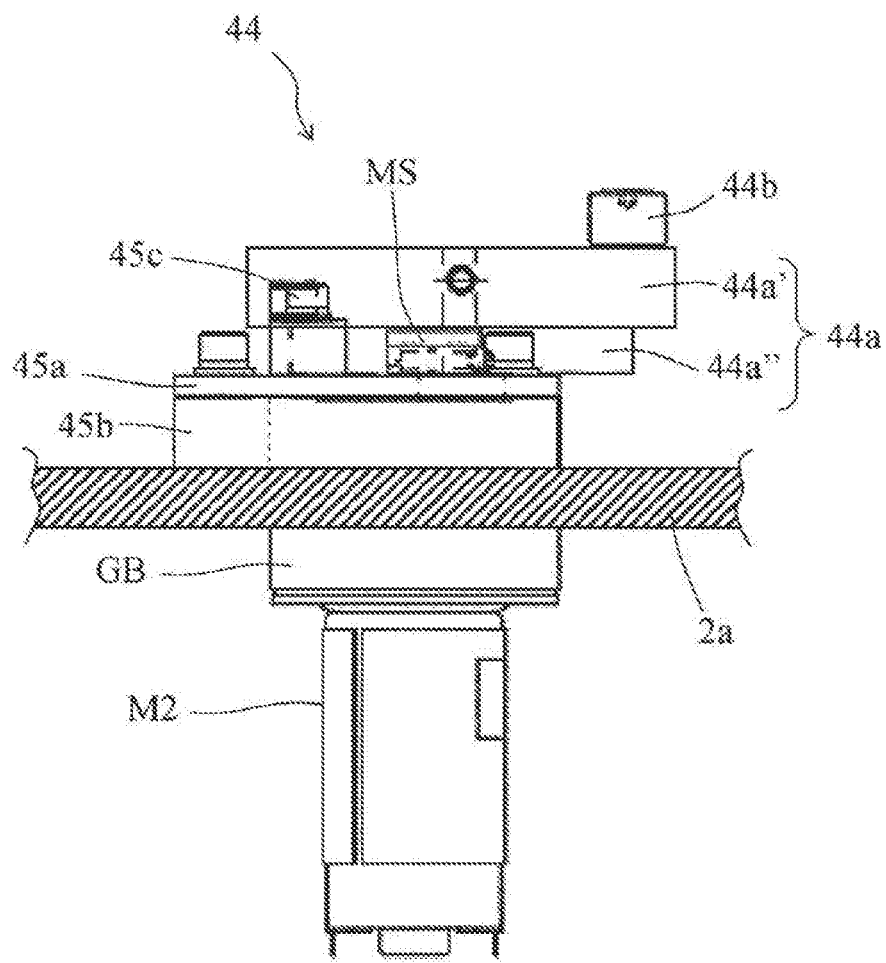
FIG. 7 is a side view of a moving device 44 as viewed from the side.

As shown in FIGS. 4 and 7, the moving device 44 includes a motor M2 having a rotary shaft (not shown in the Figure), a gear box GB for decelerating and outputting the rotation of the rotary shaft of the motor M2, a swing cam 44a concentrically fixed to an output shaft OS of the gear box GB (shown only in FIG. 4), and a cam follower 44b attached to the swing cam 44a in an eccentric state to the output shaft OS of the gear box GB (shown only in FIG. 4). The moving device 44 is attached to the base portion 2a of the vehicle body 2 of the automatic guided vehicle 1 by means of a bracket 45a and a mounting block 45b so that the axial direction of the rotary shaft of the motor M2 faces the vertical direction. The output shaft OS is an example of a configuration corresponding to the "rotary shaft" in the present disclosure.

Figure 8:
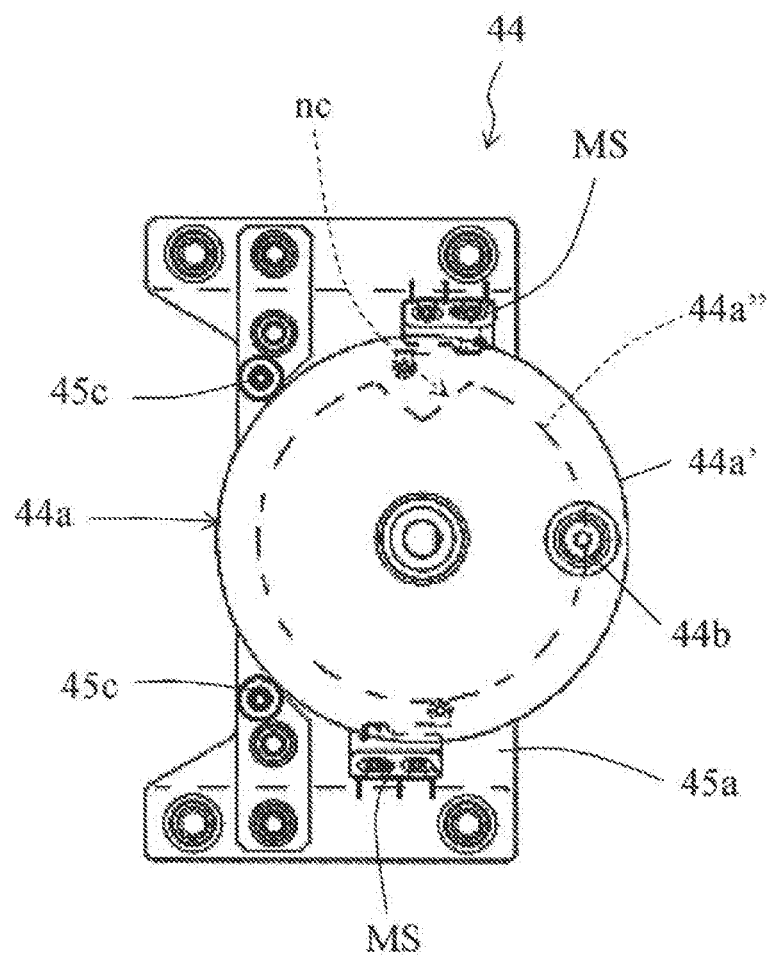
FIG. 8 is a plan view of the moving device 44 as viewed from above.

As shown in FIGS. 7 and 8, the swing cam 44a is configured as a stepped cylindrical member having a large diameter cylindrical portion 44a' and a small-diameter cylindrical portion 44a". The cam follower 44b is attached to the large diameter cylindrical portion 44a', and the rotation thereof is guided by a pair of support rollers 45c and 45c attached to the bracket 45a. As shown in FIG. 8, a notch nc that can be engaged with a micro switch MS, which is attached to the bracket 45a, is formed on the outer peripheral surface of the small diameter cylindrical portion 44a". Note that a pair of the micro switches MS are disposed at positions opposed to each other across the axial center of the swing cam 44a. Engagement of the notch nc with the pair of microswitches MS notifies a user of the rotational position of the swing cam 44a, that is, the position of the rotational direction of the cam follower 44b.

As shown in FIGS. 3 and 4, the pair of slide guides 46 and 46 are disposed so as to hold both side surfaces along the longitudinal direction of the swing arm 42. As shown in FIG. 4, guide grooves 46a and 46a to be engaged with the swing arm 42 is formed extending along the longitudinal direction on the inner side (the side on which the swing arm 42 is disposed) of the pair of slide guides 46 and 46. This configuration allows the swing arm 42 to be stably and smoothly moved. The pair of slide guides 46 and 46 is an example of a configuration corresponding to the "guide member" in the present disclosure.

The moving device 44 thus configured drives the motor M2 to rotate the swing cam 44a via the gear box GB and rolls the cam follower 44b revolving around the output shaft OS of the gear box GB in the elongated hole 42a of the swing arm 42 in accordance with the rotation of the swing cam 44a, thereby linearly moving the swing arm 42. That is, the moving device 44 converts the rotational motion of the motor M2 into the linear motion of the swing arm 42.

The control device 10 is configured as a microprocessor mainly including a CPU, and in addition to the CPU, includes a ROM for storing a processing program, a RAM for temporarily storing data, an input/output port not shown in the drawing, and a communication port. A signal is inputted to the control device 10 through the input port, such signals include: a signal that is necessary for the automatic guided vehicle 1 to travel, for example, a detection signal from a traveling sensor (not shown) for detecting a guiding band laid on the floor surface as a traveling road, or a command signal from a marker sensor (not shown) set beside an induction belt for detecting a marker including a command to the automatic guided vehicle 1; and a signal necessary for managing the battery 8, for example, a voltage between both terminals from a voltage sensor (not shown) provided between the terminals of the battery 8 or a current applied to the drive unit 4 detected by a current sensor (not shown). Furthermore, signals such as a drive signal to the drive unit 4, a drive signal to the motor M1 for driving the hook member 24, a drive signal to the motor M2 for driving the swing arm 42 are outputted from the control device 10 via the output port.

Figure 9:
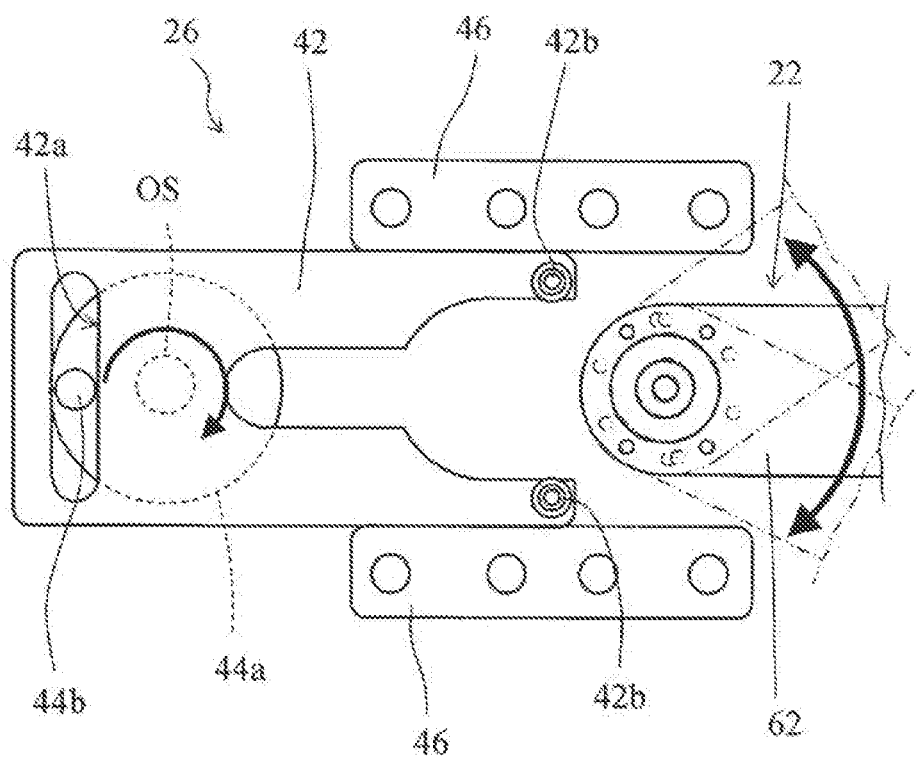
FIG. 9 is an explanatory view of a state in which the engagement between a swivel regulating mechanism 26 and a connecting member 22 is released as viewed from above.
Figure 10:
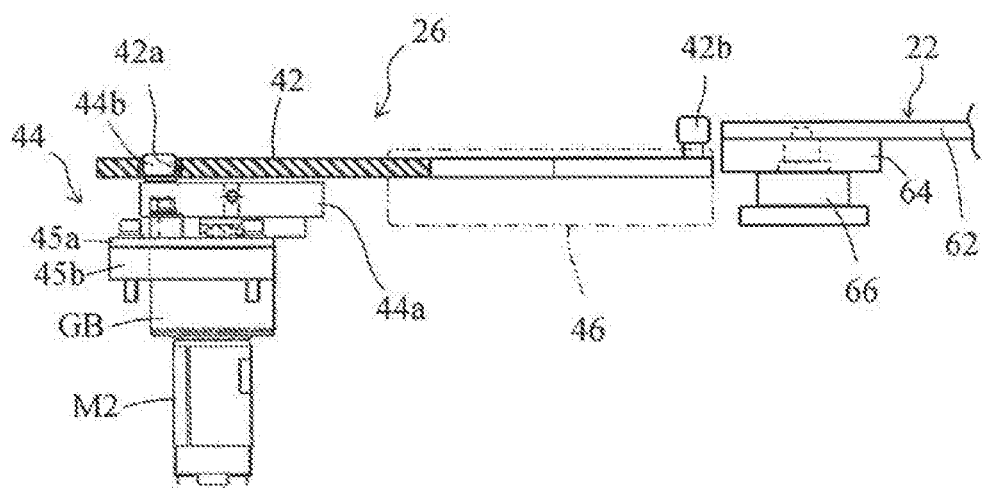
FIG. 10 is an explanatory view showing a part of the state in which the engagement between the swivel regulating mechanism 26 and the connecting member 22 is released as viewed from the side in cross section.

Next, an operation of connecting the carriage 90 to the automatic guided vehicle 1 having the towing device 20 thus configured mounted thereon will be described. When the automatic guided vehicle 1 is traveling while towing the carriage 90, as shown in FIGS. 9 and 10, the swiveling (swinging) of the connecting member 22 relative to the automatic guided vehicle 1 is not regulated by the swivel regulating mechanism 26. That is, the swing arm 42 and the connecting member 22 is in a state of being disengaged, and the carriage 90 is in a state of being steerably connected to the automatic guided vehicle 1. As a result, the steerability of the automatic guided vehicle 1 traveling while towing the carriage 90 is ensured. It should be noted that at this time, the position of the cam follower 44b in the rotational direction is opposite (the left side in FIGS. 9 and 10) the side where the connecting member 22 is disposed with respect to the output shaft OS of the gear box GB.

On the other hand, when connecting the carriage 90 to the automatic guided vehicle 1, the control device 10 controls the drive of the swivel regulating mechanism 26 so that the swiveling (swinging) of the connecting member 22 with respect to the automatic guided vehicle 1 is regulated by the swiveling restricting mechanism 26. Specifically, the motor M2 is driven and controlled by the control device 10, and the swing cam 44a is rotated in the clockwise direction as shown in FIG. 9.

Figure 11:
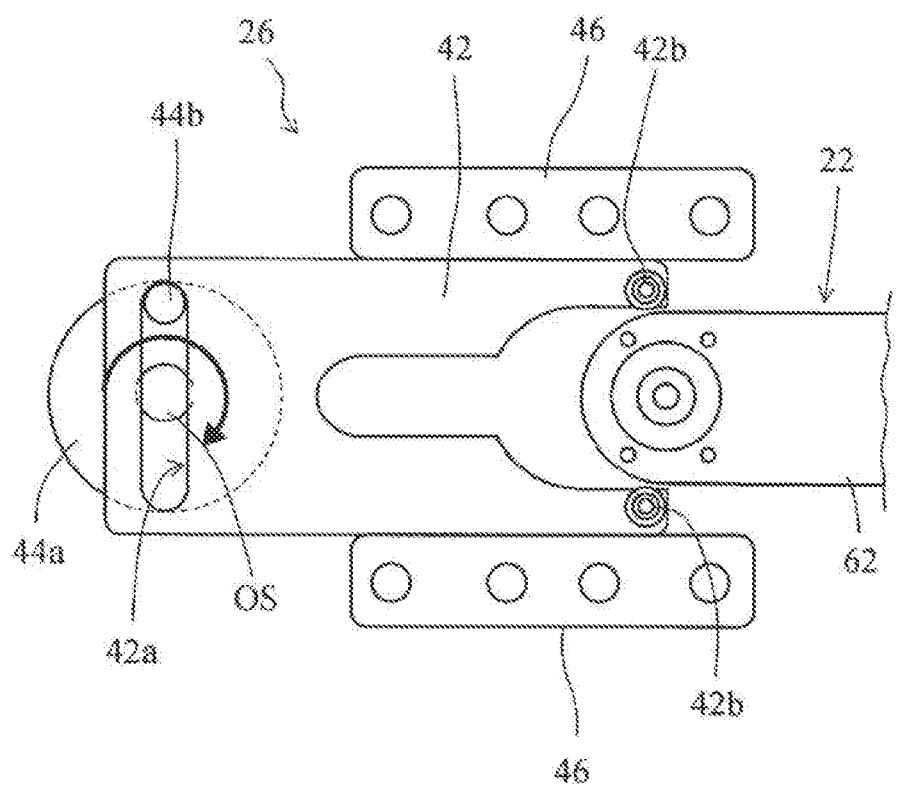
FIG. 11 is an explanatory view of a state in which the swivel regulating mechanism 26 is moved toward the engagement with the connecting member 22 as viewed from above.
Figure 12:
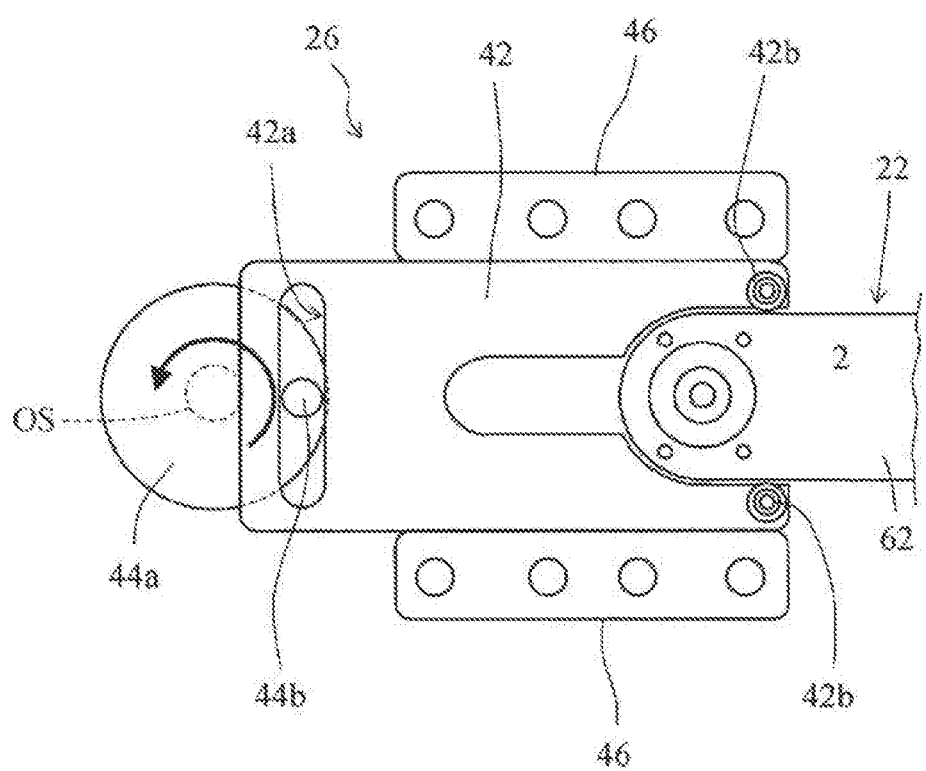
FIG. 12 is an explanatory view of a state in which the swivel regulating mechanism 26 and the connecting member 22 are engaged with each other as viewed from above.

With this configuration, as shown in FIGS. 11 and 12, the cam follower 44b revolves around the output shaft OS of the gear box GB. Here, since the cam follower 44b is engaged in the elongated hole 42a of the swing arm 42, the cam follower 44b linearly moves the swing arm 42 toward the connecting member 22 while rolling in the elongated hole 42a. At this time, the swing arm 42 is guided by the pair of slide guides 46 and 46, and therefore is capable of moving stably and smoothly.

Then, as shown in FIGS. 12 and 13, the pair of guide rollers 42b and 42b engages with the connecting member 22 in a manner of holding the connecting member 22 as the swing arm 42 moves toward the connecting member 22. More specifically, the bifurcated portion of the swing arm 42 holds the side surface of the bearing holder 64 of the connecting member 22, and together therewith the guide rollers 42b and 42b hold the side surfaces of the slide plate 62 of the connecting member 22 as well. As a result, the swiveling (swinging) of the connecting member 22 with respect to the automatic guided vehicle 1 is regulated. Note that in this configuration, the side surfaces of the slide plate 62 are held by the pair of guide rollers 42b and 42b; hence the relative movement of the swing arm 42 with respect to the connecting member 22 can be made smooth, and the engagement and disengagement between the swing arm 42 and the connecting member 22 can be carried out smoothly.

Thus, with this configuration, when connecting the carriage 90 to the automatic guided vehicle 1, the swiveling (swinging) of the connecting member 22 with respect to the automatic guided vehicle 1 is regulated by the swivel regulating mechanism 26 without generating a relative positional change of the hook member 24 with respect to the carriage 90, in particular, to the frame 92. Consequently, there is no deterioration in the engagement performance between the automatic guided vehicle 1 and the carriage 90.

Note that after the carriage 90 is connected to the automatic guided vehicle 1, the control device 10 drives and controls the swivel regulating mechanism 26 so as to release the swiveling (swinging) regulation of the connecting member 22 with respect to the automatic guided vehicle 1 regulated by the swivel regulating mechanism 26. More specifically, the control device 10 drives and controls the motor M2 so that the swing cam 44a is rotated counterclockwise in FIG. 12. As a result, the cam follower 44b revolves counterclockwise about the output shaft OS of the gear box GB and the swing arm 42 is linearly moved in a direction away from the connecting member 22, thereby releasing the engagement between the swing arm 42 and the connecting member 22.

In accordance with the towing device 20 according to the present exemplary embodiment described above, a configuration thereof is that when connecting the automatic guided vehicle 1 to the carriage 90, the swing arm 42 is engaged with the connecting member 22 to regulate the swiveling (swinging) of the connecting member 22 with respect to the automatic guided vehicle 1 and the engagement between the swing arm 42 and the connecting member 22 is released after the automatic guided vehicle 1 is connected to the carriage 90. It is therefore possible to ensure the steerability of the automatic guided vehicle 1 when traveling while towing the carriage 90 and suppress a deterioration in the engagement performance of the hook member 24 to the frame 92 of the carriage 90 when connecting the automatic guided vehicle 1 to the carriage 90. Note that only the motor M2 is driven and controlled by the control device 10 making it possible to easily ensure a configuration for regulating the swiveling of the connecting member 22 and canceling the swiveling regulation thereof.

In the present exemplary embodiment, a configuration is adopted in which the hook member 24 is fastened to the other end portion of the connecting member 22 in the longitudinal direction; however, the present advancement is not limited thereto. For example, a configuration may be adopted in which the other longitudinal end portion of the connecting member 22 is bent to form the other longitudinal end portion of the connecting member 22 itself into a hook shape. Alternatively, a configuration may be adopted in which a member to be fastened to the end portion of the connecting member 22 is not limited to the hook member 24 but a pin may also be retractably provided at the other longitudinal end portion of the connecting member 22 to thereby hook the pin member to the frame 92 of the carriage 90. In this case, the pin is an example of a configuration corresponding to the "hook member" in the present disclosure.

In the present exemplary embodiment, a configuration is adopted in which the moving device 44 is constituted by the motor M2, the gear box GB, the swing cam 44a, and the cam follower 44*b*, and the rotational motion of the swing cam 44*a* generated by the motor M2 is converted into the linear motion of the swing arm 42 by the cam follower 44*b* that is engaged in the elongated hole 42*a* of the swing arm 42; however, the present advancement is not limited thereto. A configuration may be adopted in which, for example, the motor M2 and a screw mechanism constitutes the moving device 44, and the rotational motion generated by the motor M2 is converted into the linear motion of the swing arm 42 by the screw mechanism. Alternatively, the moving device 44 may be constituted by a cylinder mechanism (a pneumatic cylinder mechanism, a hydraulic cylinder mechanism, an electromagnetic cylinder mechanism, or the like) having a piston, whereby the swing arm 42 is moved linearly by a linear motion of the piston In the present exemplary embodiment, the swing arm 42 is configured to move along the longitudinal direction (horizontal direction, up and down direction in FIG. 1) of the swing arm 42 so as to engage with and disengage from the connecting member 22. However, a configuration may be adopted in which the swing arm 42 is moved along a direction orthogonal (vertical direction, left and right direction in FIG. 1) to the longitudinal direction (horizontal direction, up and down direction in FIG. 1) of the swing arm 42, thereby engaging with the connecting member 22 and disengaging therefrom. In this case, the swing arm 42 may be configured to reciprocate in the vertical direction due to the rotational motion of the motor M2 (move retractably relative to the connecting member 22), or the swing arm 42 may be configured to reciprocate in the vertical direction (move retractably relative to the connecting member 22) by means of a cylinder mechanism having a piston (a pneumatic cylinder mechanism, a hydraulic cylinder mechanism, an electromagnetic cylinder mechanism, or the like).

In the present exemplary embodiment, a configuration is adopted in which one end side of the swing arm 42 in the longitudinal direction is bifurcated, the guide rollers 42*b* and 42*b* are disposed at the tip end portion of the bifurcated portion, the side surface of the bearing holder 64 of the connecting member 22 is held by the bifurcated portion of the swing arm 42, and the side surfaces of the sliding plate 62 of the connecting member 22 are held by the guide rollers 42*b* and 42*b*. However, the provision of the guide rollers 42*b* and 42*b* is not required. In this case, the bifurcated portion of the swing arm 42 is configured to be formed thick which allows the bifurcated portion to hold both the side surface of the bearing holder 64 and the side surface of the slide plate 62.

In the present exemplary embodiment, a configuration is adopted in which the swing cam 44*a* is attached to the output shaft OS of the gear box GB and the rotation of the motor M2 is transmitted to the swing cam 44*a* via the gear box GB. However, the swing cam 44*a* may be configured to be attached to the rotary shaft of the motor M2, thereby directly transmitting the rotation of the motor M2 to the swing cam 44*a*. In this case, the rotary shaft of the motor M2 is an example of a configuration corresponding to the "rotary shaft" in the present disclosure.

The present exemplary embodiment shows an example of a preferred embodiment for carrying out the present advancement. Therefore, the present invention is not intended to be limited to the configuration of the present exemplary embodiment. Note that a description is given below of a correspondence relation between each component of the present exemplary embodiment and each component of the present invention.

REFERENCE SIGNS LIST

1 Automatic guided vehicle (automatic guided vehicle)
2 Vehicle body (vehicle body)
2*a* Base portion
4 Drive unit
6 Front side caster (caster)
8 Battery
10 Control device
20 Towing device (towing device)
22 Connecting member (connecting member)
24 Hook member (hook member)
26 Swivel regulating mechanism (swivel regulating mechanism
42 Swing arm (holding plate)
42*a* Elongated hole (elongated hole)
42*b* Guide roller (holding portion guide roller)
44 Moving device (moving device)
44*a* Swing cam (disc member)
44*a*' Large diameter cylindrical portion
44*a*" Small diameter cylindrical portion
44*b* Cam follower (cam roller)
45*a* Bracket
45*b* Mounting block
45*c* Support roller
46 Slide guide (guide member)
46*a* Guide groove
52 Swing frame
54 Tow hook
56 Drive mechanism (drive mechanism)
56*a* Elevating cam
56*b* Cam follower
62 Slide plate
64 Bearing holder
66 Swivel shaft
66*a* Stepped shaft portion
66*a*' Small diameter shaft portion
66*b* Flange portion
90 Carriage (carriage)
92 Frame
M1 Motor
M2 Motor
GB Gear box
OS Output shaft (rotary shaft)
nc Notch

What is claimed is:

1. A towing device for an automatic guided vehicle capable of connecting the automatic guided vehicle and a carriage, the towing device comprising:
    a connecting member with one end that is swivelably connected to the automatic guided vehicle;
    a hook member disposed at the other end of the connecting member and configured to be engageable with a frame of the carriage;
    a drive mechanism for driving the hook member to engage the hook member to the frame and for driving the hook member to release the engagement between the hook member and the frame; and
    a swivel regulating mechanism capable of regulating the swiveling of the connecting member with respect to the automatic guided vehicle.

2. The towing device for an automatic guided vehicle according to claim 1, the towing device further comprising:

a control device for driving and controlling the swivel regulating mechanism so as to regulate the swiveling of the connecting member with respect to the automatic guided vehicle when engaging the hook member to the frame.

3. The towing device for an automatic guided vehicle according to claim 1, wherein the swivel regulating mechanism includes a holding plate having a holding portion capable of holding the connecting member from both sides in a swiveling direction of the connecting member, and a moving device capable of moving the holding plate between a holding position for holding the connecting member and a release position for releasing the holding of the connecting member.

4. The towing device for an automatic guided vehicle according to claim 3, wherein the holding portion includes guide rollers that are in contact with the connecting member to guide relative movement of the holding plate with respect to the connecting member.

5. The towing device for an automatic guided vehicle according to claim 3, wherein the moving device includes a motor having a rotary shaft, a disc member concentrically coupled to the rotary shaft, and a cam roller provided on the disc member in an eccentric state with respect to the rotary shaft, and the holding plate includes an elongated hole that extends in a direction orthogonal to a moving direction of the holding plate and that is configured to engage with the cam roller, so that the cam roller revolving around the rotary shaft along with the rotation of the rotary shaft is rolled in the elongated hole to thereby linearly move the holding plate.

6. The towing device for an automatic guided vehicle according to claim 3, wherein the moving device further includes a guide member disposed along the movement direction of the holding plate to enable holding at least a part of the holding plate so as to guide the movement of the holding plate.

7. An automatic guided vehicle comprising:
a vehicle body;
a drive unit including drive wheels swivelably supported with respect to the vehicle body; and
a caster disposed so as to be freely swivelable with respect to the vehicle body, the automatic guided vehicle being configured to be capable of towing a carriage by the towing device for an automatic guided vehicle according to claim 1.

* * * * *